United States Patent
Papakipos et al.

(10) Patent No.: US 10,467,661 B2
(45) Date of Patent: Nov. 5, 2019

(54) OFFLINE CONVERSION MEASUREMENT FOR ADVERTISEMENTS PRESENTED TO USERS OF AN ONLINE SYSTEM

(71) Applicant: Facebook, Inc., Menlo Park, CA (US)

(72) Inventors: Matthew Nicholas Papakipos, Palo Alto, CA (US); Michael John Toksvig, Palo Alto, CA (US); Charles Joseph Hughes, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 1105 days.

(21) Appl. No.: 14/085,612

(22) Filed: Nov. 20, 2013

(65) Prior Publication Data

US 2015/0142551 A1 May 21, 2015

(51) Int. Cl.
*G06Q 30/02* (2012.01)
(52) U.S. Cl.
CPC ..... *G06Q 30/0277* (2013.01); *G06Q 30/0261* (2013.01); *G06Q 30/0272* (2013.01)
(58) Field of Classification Search
CPC .................................. G06Q 30/0207–0277
USPC ............................................ 705/14.1–14.73
See application file for complete search history.

(56) References Cited

U.S. PATENT DOCUMENTS

| | | | | |
|---|---|---|---|---|
| 2007/0185768 A1* | 8/2007 | Vengroff | ................ | G06Q 30/02 705/14.64 |
| 2011/0191191 A1* | 8/2011 | Bax | ........................ | G06Q 30/02 705/14.71 |
| 2012/0010939 A1* | 1/2012 | Krishnamoorthy | .... | G06Q 30/02 705/14.39 |
| 2012/0166272 A1* | 6/2012 | Wiley | ................ | G06Q 30/0246 705/14.45 |
| 2012/0239500 A1* | 9/2012 | Monahan | .............. | G01S 5/0036 705/14.58 |

* cited by examiner

*Primary Examiner* — Sam Refai
(74) *Attorney, Agent, or Firm* — Fenwick & West LLP

(57) ABSTRACT

An online system identifies a conversion of an advertisement when a client device associated with an online system user is within a threshold distance of a physical location associated with the advertisement. The client device sends obfuscated information identifying the user associated with the client device and the location of the client device to an independent third party when the client device is within a threshold distance of the physical location associated with the advertisement. Using information from the client device, the third party requests information from the online system identifying one or more groups including the user. Based on information identifying groups including various online system users, the third party generates information identifying conversions associated with different groups. The online system may determine effectiveness of various advertisements using the information from the third party identifying conversions associated with different groups.

17 Claims, 4 Drawing Sheets

OFFLINE CONVERSION MEASUREMENT FOR ADVERTISEMENTS PRESENTED TO USERS OF AN ONLINE SYSTEM

BACKGROUND

This disclosure relates generally to online systems, and in particular to presentation of advertisements to users of an online system.

An online system allows its users to connect to and communicate with other online system users. Users may create profiles on an online system that are tied to their identities and include information about the users, such as interests and demographic information. The users may be individuals or entities such as corporations or charities. Because of the increasing popularity of online systems and the increasing amount of user-specific information maintained by online systems, such as social networking systems, an online system provides an ideal forum for advertisers to increase awareness about products or services by presenting advertisements to online system users.

Presenting advertisements to users of an online system allows an advertiser to gain public attention for products or services and to persuade online system users to take an action regarding the advertiser's products, services, opinions, or causes. Many online systems generate revenue by displaying advertisements to their users. Frequently, online systems charge advertisers for each presentation of an advertisement to an online system user (e.g., each "impression" of the advertisement) or interaction with an advertisement by an online system user.

Metrics describing the effectiveness of advertisements presented to online system users allow advertisers to present advertisements more likely to be interacted with by online system users. For example, metrics measuring the effectiveness of an advertiser's advertisements in driving user visitation to physical sites, such as retail stores, allow advertisers to better leverage advertisements presented by online systems. Conventionally, advertisers poll potential customers to determine whether they have been exposed to particular advertisements or whether exposure to particular advertisements caused them to visit certain physical locations associated with the advertisements to obtain metrics describing advertisement effectiveness.

However, polling potential customers often results in unreliable information because potential customers often have limited recall regarding how they became aware of an advertiser's products or how they were enticed to visit a physical location. Additionally, polling potential customers is intrusive to the potential customers, which decreases the likelihood of potential customers responding to polling. The limited reliability of information received by polling as well as the low response of potential customers to polling limits the accuracy of conventionally generated advertising metrics.

SUMMARY

To more accurately generate metrics describing effectiveness of an advertisement presented to an user of an online system, the online system identifies a conversion of an advertisement presented to the user when a client device associated with the user is within a threshold distance of a physical location associated with the advertisement (a "conversion location"). For example, when a user is within a threshold distance of a retail store corresponding to a physical location associated with an advertisement presented to the user, the online system identifies that the user has performed a conversion of the advertisement. To determine one or more physical locations associated with an advertisement, the online system receives information, such as GPS coordinates or other location information, from an advertiser specifying one or more conversion locations associated with the advertisement. Examples of conversion locations include physical locations corresponding to a retail store, a company headquarters, or any physical location where brands, products, or services of an advertiser may be promoted or sold.

Information identifying the one or more conversion locations associated with an advertisement is communicated to client devices associated with various online system users. For example, information describing a conversion location associated with an advertisement is communicated to a client device along with the advertisement to be presented to a user via the client device. Additionally, information identifying one or more conversion locations associated with an advertisement may be communicated to one or more client devices associated with users in a "holdout group" that are not presented with the advertisement. This allows the online system to identify conversions occurring by users that are not presented with the advertisement to more accurately assess effectiveness of the advertisement in causing conversion events. In addition, the online system, or an advertiser, may identify various advertising groups of users based on demographic information or other suitable information associated with online system users.

When a client device associated with a user presented with an advertisement is within a threshold distance of a conversion location, the client device communicates encrypted information identifying its location and the user associated with the client device to an independent third party. Similarly, when a client device associated with a user in a holdout group associated with an advertisement is within a threshold distance of a conversion location associated with the advertisement, the client device communicates encrypted information identifying its location and its associated user to the independent third party. The independent third party is any trusted party capable of anonymously gathering and compiling data associated with user visitation to physical locations and providing the compiled data to an entity, such as the online system. In some implementations, the encrypted location-identifying and user-identifying information is sent to the independent third party by the client device, or another device (e.g., a point of sale terminal, in response to an event (e.g., a credit card/membership card scan, a facial/fingerprint recognition scan, a telephone call/text message claiming an offer, etc.). Encrypting or otherwise obfuscating the location and user-identifying information communicated to the independent third party allows the online system to protect its users' privacy. For example, a client device sends encrypted GPS location information and an encrypted form of its media access control address (MAC address) to a third party when it is within a threshold distance of a conversion location associated with an advertisement.

The third party requests information identifying one or more advertising groups including the user from the online system using the user-identifying information received from a client device. For example, a request sent to the online system includes the encrypted user-identifying information received by the independent third party form a client device, and the online system identifies one or more advertising groups including the user by decrypting the encrypted user-identifying information. Information identifying one or more advertising groups including the user is encrypted and sent to the independent third party by the online system. In some implementations, a client device sends information about advertising groups including a user to the independent third party when the client device is within a threshold distance of a conversion location rather than sending encrypted information identifying the user. Using the information identifying one or more advertising groups including users, the independent third party aggregates data received from various client devices to generate a report identifying a number or percentage of users in various advertising groups that performed conversions. For example, the report identifies a total number of users belonging to various advertising groups that were within a threshold distance of one or more conversion locations. Based on the report, the online system may generate information describing effectiveness of an advertisement in directing users to conversion locations by comparing conversions associated with users in different advertising groups presented with the advertisement to conversions associated with users that were not presented with the advertisement.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
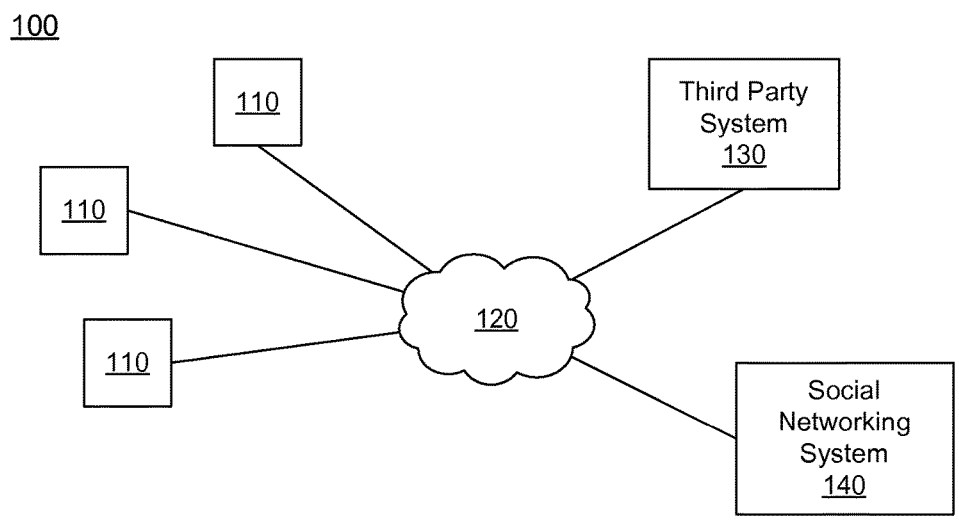
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. For example, the online system 140 is a social networking system. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130.

Figure 2:
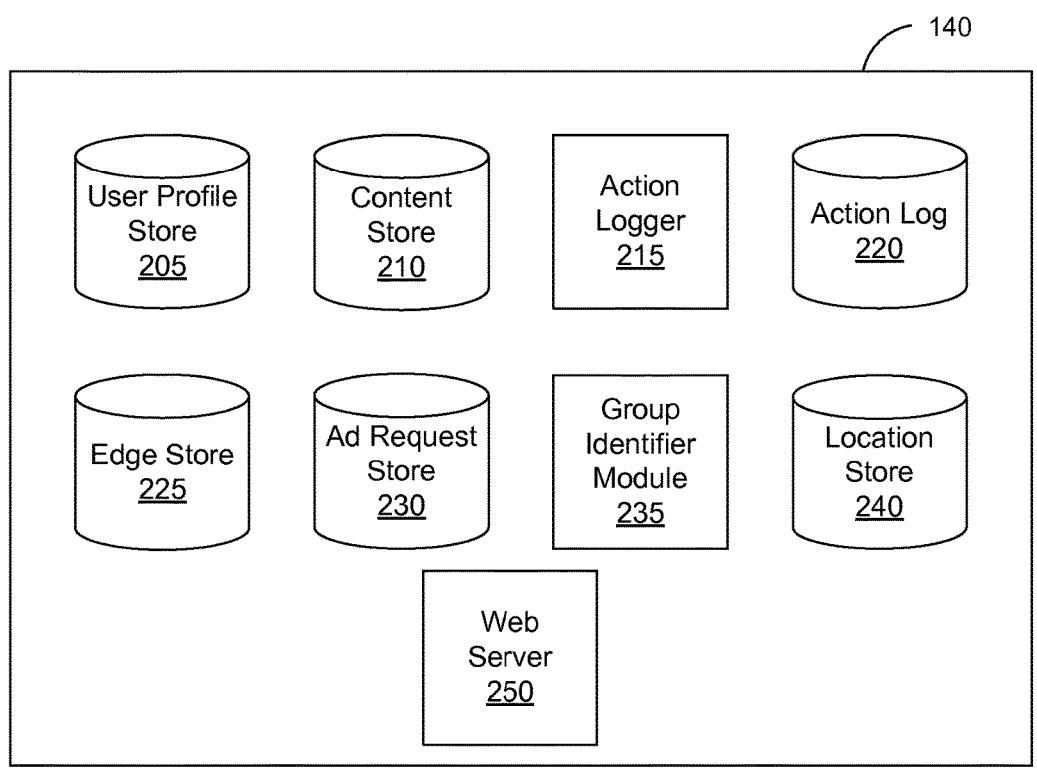
FIG. 2 is a block diagram of an online system, in accordance with an embodiment.

FIG. 2 is a block diagram of an architecture of the online system 140, which may be a social networking system in some embodiments. The online system 140 shown in FIG. 2 includes a user profile store 205, a content store 210, an action logger 215, an action log 220, an edge store 225, an ad request store 230, a group identification module 235, a location store 240, and a web server 245. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, social networking system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are stored in the ad request store 230. An advertisement request includes advertisement content and a bid amount. The advertisement content is text data, image data, audio data, video data, or any other data suitable for presentation to a user. In various embodiments, the advertisement content also includes a network address specifying a landing page to which a user is directed when the advertisement is accessed.

The bid amount is associated with an advertisement by an advertiser and specifies an amount of compensation the advertiser provides the online system 140 if the advertisement is presented to a user or accessed by a user. In one embodiment, the bid amount is used by the online system to determine an expected value, such as monetary compensation, received by the online system 140 for presenting the advertisement to a user, if the advertisement receives a user interaction, or based on any other suitable condition. For example, the bid amount specifies a monetary amount that the online system 140 receives from the advertiser if the advertisement is displayed and the expected value is determined based on the bid amount and a probability of a user accessing the displayed advertisement.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. The targeting criteria may also specify interactions between a user and objects performed external to the online system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

An ad request may also include information specifying one or more physical locations associated with an advertisement. For example, the ad request includes global positioning system (GPS) coordinates specifying one or more locations, identifiers of wireless beacons (e.g., Wi-Fi, Bluetooth, etc.) at known locations, identifiers of cellular communication towers at known locations, or other information describing one or more physical locations. For example, physical locations associated with an advertisement identify retail locations or other physical locations where brands, products, or services of an advertiser are promoted or sold. These physical locations associated with an advertisement are referred to herein as "conversion locations" associated with the advertisement.

The group identification module 235 identifies one or more advertising groups including a user based on information identifying the user. For example, the group identification module 235 identifies a user by decrypting encrypted or obfuscated information identifying a user received by the online system 140 and identifies one or more advertising groups including the user. In one embodiment, the group identification module 235 associates group identifiers with user identifying information (e.g., user identifiers) and retrieves group identifiers. When user identifying information is determined by the group identification module 235, the group identifiers associated with the user identifying information is used to identify one or more advertising groups including the user. The group identification module 235 may include a user in an advertising group based on demographic information associated with a user, actions associated with a user, if an advertisement was shown to a user, if a certain combinations of advertisements were shown to a user, or other suitable information associated with a user. For example, a user is included in one or more groups based on its age, location, amount of time elapsed since an advertisement was shown to them, or other suitable information and the group identification module 235 associates group identifiers with the user's user identifying information based on the information. If the group identification module 235 determines that one or more advertising groups include a user, the group identification module 235 encrypts information about the advertising groups including the user for communication to an entity external to the social networking system 140, such as a third party system 130. The advertising groups may include, but are not limited to, a "test group" that includes users that were eligible to see an advertisement, an "exposed group" that includes users in the "test group" that were exposed to the advertisement, a "control (or holdout) group" that includes users that were eligible to see the advertisement but were prevented from seeing it for measurement purposes, and a "shadow group" that includes users in the "control group" for which the advertisement would have been shown (e.g., the advertisement won the ad auction for the user) but was not shown for measurement purposes.

In various embodiments, the group identification module 235 may limit identification of advertising groups including a user based on one or more privacy settings associated with the user. For example, if a user opts out of advertisement tracking by potential advertisers, one or more advertising groups including the user are not identified to a potential advertiser requesting identification of an advertising group including the user. Additionally, one or more advertising groups including the user may not be identified to an advertiser if the user is not included in an advertising group specified by the advertiser. Similarly, if an advertisement was not presented to a user and the user is not included in a group of users from which the advertisement was withheld from presentation, information identifying one or more groups including the user is not identified to an advertiser associated with the advertisement. For example, if a user was eligible to be presented with an advertisement, but the advertisement was not selected for presentation to the user, information identifying one or more advertising groups including the user is not retrieved when requested by an advertiser even if a client device associated with the user was within a threshold distance of a location associated with the advertisement. Additionally, in some embodiments where the user is included in a group of users from which the advertisement was withheld from presentation (e.g., a holdout group), information identifying the holdout groups including the user may be provided to the advertiser.

The location store 240 stores information identifying conversion locations associated with one or more advertisements. In one embodiment, conversion locations are included in one or more ad requests, so the location store 240 extracts conversion locations from one or more ad requests. Alternatively, information identifying conversion locations is received separate from ad request and includes an ad request identifier to associate a conversion location with an advertisement specified by an ad request. For example, the location store 240 includes coordinates from one or more ad requests that specify geographic locations of retail stores, buildings, and other physical locations where brands, products, or services of an advertiser may be promoted or sold. Stored information describing conversion locations may also include various attributes of the locations, such as nearby wireless access points, cellular phone towers, etc. For example, information describing conversion location may include a combination of signal strengths from several wireless access points. Examples of data stored by the location store 240 include a place identifier (e.g., store name, street address, etc.) and GPS or other information suitable for identifying a physical location.

The web server 245 links the online system 140 via the network 120 to the one or more client devices 110, as well as to the one or more third party systems 130. The web server 245 serves web pages, as well as other content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that is stored in the content store 210. Additionally, the web server 245 may provide application programming interface (API) functionality to send data directly to native client device operating systems, such as IOS®, ANDROID™, WEBOS® or BlackberryOS.

Measurement of Offline Conversions

Figure 3:
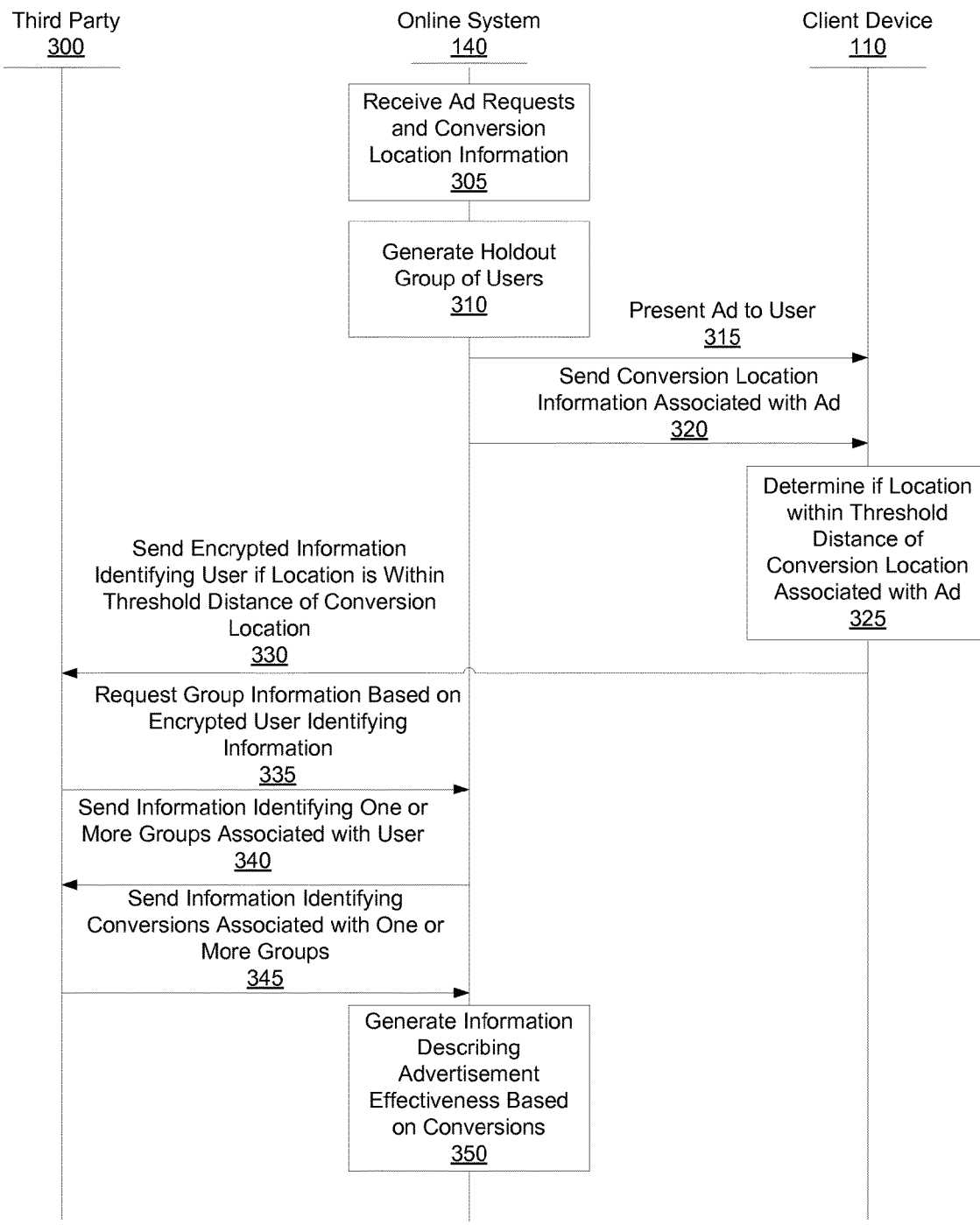
FIG. 3 is an interaction diagram of a method for determining effectiveness of an advertisement presented to online system users based on offline conversions, in accordance with an embodiment.

FIG. 3 is an interaction diagram of one embodiment of a method for determining effectiveness of an advertisement presented to online system users based on offline conversions. In the example of FIG. 3, the online system 140 receives 305 ad requests and information identifying conversion location information associated with advertisements included in the ad requests from one or more advertisers. Information identifying conversion locations associated with an advertisement may be included in an ad request for the advertisement or may be received separately from the ad request and include an identifier of an ad request with which it is associated. In one embodiment, information identifying conversion locations associated with one or more advertisements is stored in the location store 240 along with an identifier of an associate ad request included in the ad request store 230.

In some embodiments, the online system 140 generates 310 a holdout group of users for an advertisement that includes users of the online system 140 that are eligible to be presented with the advertisement, but that are not presented with the advertisement. Users included in a holdout group for an advertisement include users satisfying one or more targeting criteria associated with the advertisement. In various embodiments, users included in a holdout group may be selected randomly by the online system 140 from users eligible to be presented with an advertisement. Each user eligible to be presented with the advertisement, including those in the holdout group, is associated with information uniquely identifying the user to the online system, such as a user identifier, a credit card number, an e-mail address, etc. In one embodiment, the group identification module 235 associates a holdout group identifier with information identifying users in the holdout group.

Information used by the online system 140 to identify users is communicated to client devices 110 associated with various users. For example, user identifying information associated with the user by the online system 140 is communicated to client devices 110 associated with users and accessing the online system via an application executing on a client device 110. In various embodiments, the user identifying information is encrypted before communication to a client device 110 associated with the user.

When the online system 140 identifies an opportunity to present an advertisement to a user via a client device 110, the online system 140 determines if the user associated with the client device is eligible to be presented with the advertisement. If the user is eligible to be presented with the advertisement, the online system 140 also determines if the user is in the holdout group associated with the advertisement. For example, when the online system 140 receives a request from a client device 110 to present an advertisement, the online system 140 determines if the user is eligible to be presented with an advertisement and, if the user is eligible to be presented with the advertisement, determines if is in a holdout group associated with the advertisement.

If a user associated with a client device 110 is eligible to be presented with the advertisement and not in a holdout group associated with the advertisement, the online system 140 communicates the advertisement to the client device 110 to present 315 to the user. As described above, the advertisement may be presented 315 in response to a request to present one or more advertisements from the client device 110 to the online system 140.

In some embodiments, after presenting 315 an advertisement to a user, a client device 110 determines 325 if its location is within a threshold distance of a conversion location associated with the advertisement. If a client device 110 is located within a threshold distance (e.g., 100 feet) of the conversion location, the client device 110 sends 330 encrypted information identifying a user associated with the client device 110 and the client device's location a third party 300. Examples of user-identifying information that may be encrypted and sent 330 to the third party include: an online system user identifier, a media access control (MAC) address, a credit card identifier, a membership account identifier (e.g., a membership card number), facial recognition data, fingerprint recognition data, other biometric data, a radio frequency identifier, a phone number, or other suitable data. In some embodiments, described further in conjunction with FIG. 4A, the encrypted information sent to the third party 300 is communicated to the third party 300 by a wireless access point (e.g., a wireless router, a BLUETOOTH® beacon, etc.) rather than by a client device 110. For example, the client device 110 provides an encrypted MAC address associated with the client device 110 to a wireless access point, and the wireless access point relays the encrypted MAC address to the third party 300. The third party 300 may then resolve the encrypted user ID associated with the encrypted MAC address using a look up table or other suitable method for identifying an encrypted user ID associated with an encrypted MAC address.

In some embodiments, after presenting 315 an advertisement to a user, a client device 110 may send 330 encrypted information identifying a user associated with the client device 110 and an encrypted location associated with the client device 110 to the third party 300 when the client device 110 is within a threshold distance of a conversion location, or when another suitable event occurs (e.g., as described below with reference to FIG. 4A).

In some embodiments, information identifying a user associated with the client device 110 and/or identifying the location of the client device 110 may be encrypted or otherwise obfuscated to maintain user privacy. A client device 110 may store information about its location and transmit the location information to the third party 300 at periodic intervals or when one or more criteria are satisfied (e.g., when the client device 110 has a specific type of connection to a network 120, when the client device is within a threshold distance of a conversion location associated with the advertisement).

Various types of information may be used by the client device 110 to determine 325 if it is within a threshold distance of a conversion location. Examples of information used for determining 325 if the client device 110 is within the threshold distance of the conversion location include: dimensions associated with a conversion location (e.g., a polygon or polyhedron defining the boundaries of a building) and the client device's location, signal strength of one or more wireless access points detected by the client device 110 and associated with a conversion location (identified by basic service set identifier, service set identifier, or extended service set identifier), signal strength from a cell site detected by the client device 110 and associated with a conversion location, GPS coordinates associated with the client device 110, and a probability model based on point clouds for the location of a client device 110. GPS coordinates of the client device 110 may be determined from user-supplied information, such as check-ins to locations, or obtained via one or more sensors of the client device 110.

Figure 4A:
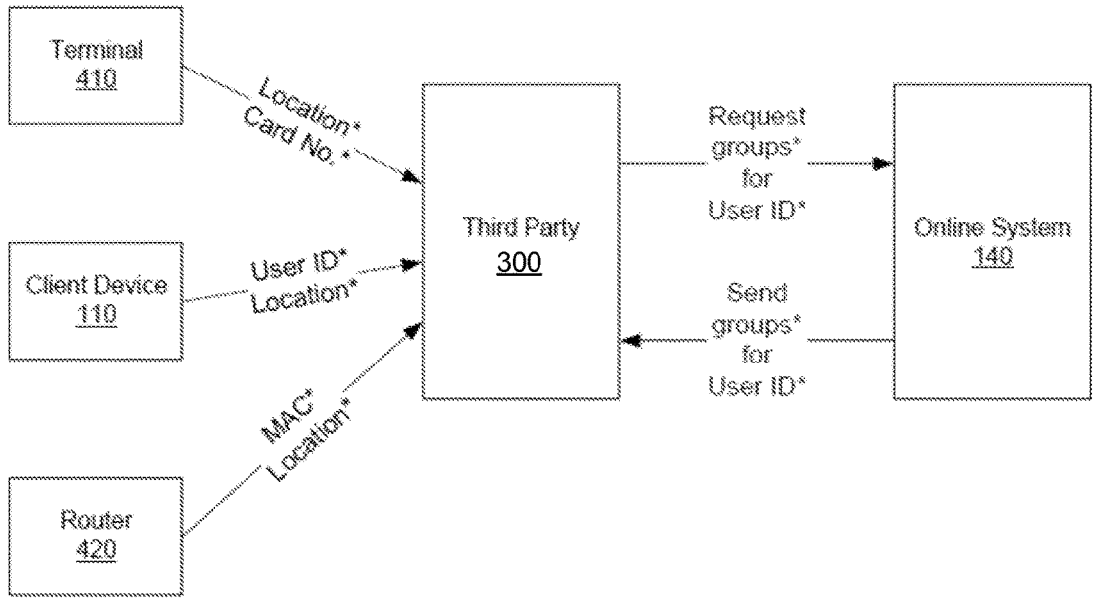
FIG. 4A is a process flow diagram of a method for determining effectiveness of an advertisement presented to online system users based on offline conversion, in accordance with an embodiment.

In some implementations, a device other than a client device 110 associated with a user sends 330 location-identifying information and user-identifying information to the third party 300, as shown in FIG. 4A. For example, a point of sale terminal, rather than a client device 110, associated with a user sends 330 location-identifying information and user-identifying information to the third party 300. As described above, location-identifying and user-identifying information may be encrypted before being sent 330 to the third party 300. In FIG. 4A, an asterisk denotes information that is encrypted or otherwise obfuscated. Additionally, user-identifying and location-identifying information may be sent 330 to the third party 300 when events other than a client device 110 being within a threshold distance of a conversion location associated with an advertisement occur. For example, encrypted location-identifying and user-identifying information is transmitted from a terminal 410 (e.g., a point of sale terminal) to the third party 300 in response to the terminal 410 scanning a credit card or membership card, the terminal 410 performing a facial or fingerprint recognition scan, the terminal 410 receiving information indicating receipt of a telephone call or a text message claiming an offer, or any other suitable event. The third party 300 may identify an encrypted user ID associated with the information received from the terminal 410 using a look up table, a hash function, or another suitable method. Similarly, a router 420 or other network access device associated with a conversion location may receive a media access control (MAC) address associated with a client device 110, encrypt the MAC address and send 330 the encrypted MAC address to the third party 300. Alternatively, the client device 110 may encrypt the MAC address of the client device 110 and send the encrypted MAC address to the third party 300, which in turn sends the encrypted MAC address to the third party 300. The third party 300 may then determine an encrypted user ID associated with the encrypted MAC address using a look up table, a hash function, or other suitable method for identifying an encrypted user ID associated with an encrypted MAC address.

Based on the information identifying the user received from the client device 110, the third party 300 requests 335 from the online system 140 information about one or more advertising groups including the user associated with the client device 110. The request from the third party 300 may include encrypted information, such as encrypted user-identifying information associated with a user. In one embodiment, the third party 300 converts received user-identifying information into obfuscated user-identifying information that is used to request 335 information identifying one or more advertising groups including a user from the online system 140. For example, the third party 300 converts an encrypted credit card number associated with a user into a corresponding encrypted online system user identifier through a function or table received from the online system 140. The third party 300 may then use the encrypted online system user identifier to request 335 information identifying one or more advertising groups including the user from the online system 140.

Using the encrypted user-identifying information from the request to identify one or more advertising groups including the user, the online system identifies one or more advertising groups including a user corresponding to the user-identifying information and sends 340 information identifying one or more advertising groups including the user to the third party 300. As described above in conjunction with FIG. 2, one or more privacy settings associated with a user corresponding to user-identifying information is used to determine whether to send 340 information identifying one or more advertising groups including the user to the third party 300. In one embodiment, the group identification module 235 decrypts encrypted information identifying the user received from the third party 300 and uses the decrypted information to identify one or more advertising groups including the user. Advertising groups including a user may change over time. For example, after an advertising campaign ends, advertising groups associated with advertisements included in the campaign are deleted or changed to reflect advertising groups associated with advertisements included in a new campaign. Similarly, as demographic information or other information associated with a user changes the user may be included in different and/or additional advertising groups based on the changed demographic information. In various embodiments, information identifying one or more advertising groups including the user is encrypted by the group identification module 235 and sent 340 to the third party 300.

Figure 4B:
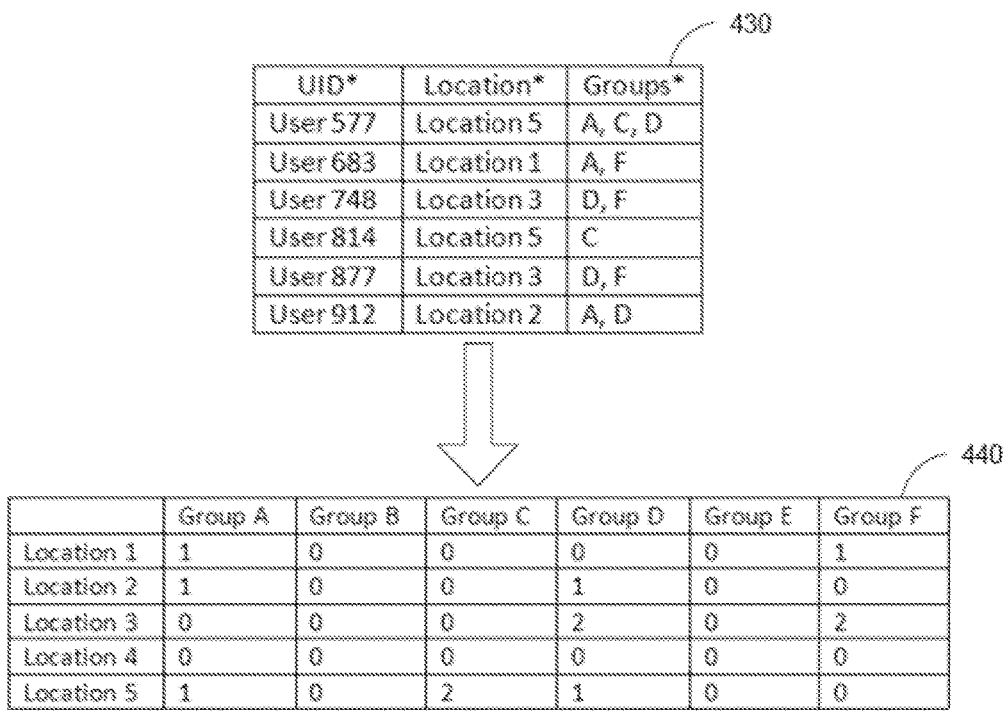
FIG. 4B is an example of data describing offline conversions by online system users, in accordance with an embodiment.

Based on the information identifying one or more advertising groups including the user, the third party 300 generates information identifying conversions associated with one or more advertising groups. FIG. 4B shows an example of encrypted information 430 identifying one or more encrypted advertising groups, received by the third party 300 and information identifying conversions associated with one or more advertising groups 440 determined by the third party 300. In the example of FIG. 4B, the third party 300 receives encrypted information associating encrypted user identifying information with an encrypted location and with one or more encrypted advertising groups. Based on the received encrypted information, the third party 300 determines a number of conversions associated with different locations for various advertising groups by totaling the conversions associated with users in each group. Information identifying conversions associated with one or more advertising groups is sent 345 to the online system 140 by the third party 300. For example, the third party 300 sends 345 information identifying a number of users in various advertising groups performing a conversion, a percentage of users belonging to a group that performed a conversion, or other suitable information. For example, information sent 345 by the third party 300 to the online system 140 includes a total number of users belonging to each advertising group within a threshold distance of various conversion locations. The information identifying conversions associated with the one or more advertising groups may be periodically pushed from the third party 300 to the online system 140. Alternatively, the online system 140 may request specific information (e.g., via a query) from the third party 300. For example, the online system 140 may query the third party 300 to request a report identifying conversions associated with one or more advertising groups that were seen at a particular location (e.g., at the Starbucks® at the corner of New Montgomery St. and Jessie St., at all Starbucks® in San Francisco, at all Starbucks in Connecticut, etc.) on a particular date and/or time (e.g., last Tuesday between 11 AM and 2 PM, last week, etc.). This prevents both the online system 140 and the third party 300 from ascertaining the identity of the user(s) who visited a particular location. Responsive to these queries, the third party 300 generates the information identifying the conversions associated with the one or more advertising groups.

In one embodiment, generalized information describing conversions associated with an advertising group is sent 345 to the online system 140 if the number or percentage of users in an advertising group performing a conversion is within a threshold of the total number of users in the group. Similarly, generalized information describing conversions associated with an advertising group is sent 345 if less than a threshold number, or percentage of users, in an advertising group performed a conversion, the third party 300 may not identify conversion events in the advertising group or may provide generalized data about conversion events by users in the group. For example, if a percentage of users in an advertising group associated with a conversion event is within a threshold percentage of 100% of the users in a group, the third party 300 sends 345 information to the online system 140 indicating that greater than a specified percentage of users in the advertising group was associated with a conversion. As an additional example, if an advertising group includes 15 users and more than 12 users were within a threshold distance of a conversion location associated with an advertisement, the third party 300 sends 345 information to the online system 140 reporting that greater than 12 users performed a conversion.

Using the information describing conversions associated with one or more advertising groups, the online system 140 generates 350 information describing the advertisement's effectiveness. The information received from the third party 330 identifies a number of conversions associated with different advertising groups, so comparing conversions associated with various advertising groups allows the online system 140 to generate 350 information describing the effectiveness of an advertisement in enticing users to perform conversions. For example, the online system 140 compares conversions performed by users in the holdout group associated with the advertisement and conversions performed by users presented with the advertisement to determine the advertisement's effectiveness. Information describing advertisement effectiveness may be communicated by the online system 140 to the advertiser or to another entity.

In some embodiments, conversion location information associated with the advertisement is also sent 320 from the online system 140 to the client device 110 presenting 140 the advertisement. For example, conversion location information associated with the advertisement is retrieved from the location store 240 and sent 320 to the client device 110. Conversion location information may be for a specific location (e.g., a particular STARBUCKS® location), or for regional locations (e.g., all STARBUCKS® locations in California). Additionally, conversion location information associated with an advertisement is sent 320 to client devices 110 associated with users included in the holdout group associated with the advertisement, although the advertisement is not presented to users included in the holdout group. Sending conversion location information to client devices 110 associated with users in the holdout group for an advertisement as well as to client devices 110 used to present 315 an advertisement allows evaluation of the effectiveness of the advertisement in causing conversions.

In these embodiments, conversion location information may be encrypted by the online system 140, with the encrypted conversion location information sent 320 to client devices 110. For example, the GPS coordinates of a conversion location or the address of a conversion location is encrypted by the online system 140 and the encrypted information is sent 320 to a client device 110. In some implementations, client devices 110 periodically request conversion location information from the online system 140, allowing the client devices 110 to receive conversion location information independent from receipt of advertisements to be presented 315. Alternatively, the online system 140 may send 320 conversion location information to client devices 110 at specified time intervals or when certain events occur, such as the beginning of an advertisement campaign.

In these embodiments, after presenting 315 an advertisement to a user and receiving conversion location information associated with the advertisement, a client device 110 determines 325 if its location is within a threshold distance of a conversion location associated with the advertisement. If a client device 110 is located within a threshold distance (e.g., 100 feet) of the conversion location, the client device 110 sends 330 encrypted information identifying a user associated with the client device 110 and the client device's location a third party 300. Similarly, if a client device 110 associated with a user in a holdout group for the advertisement is within a threshold distance of a conversion location associated with the advertisement, encrypted information identifying the user associated with the client device 110 and the location of the client device 110 is sent 330 to the third party 300. The process then continues as described above.

Alternative Implementations for Measurement of Offline Conversions

Figure 5:
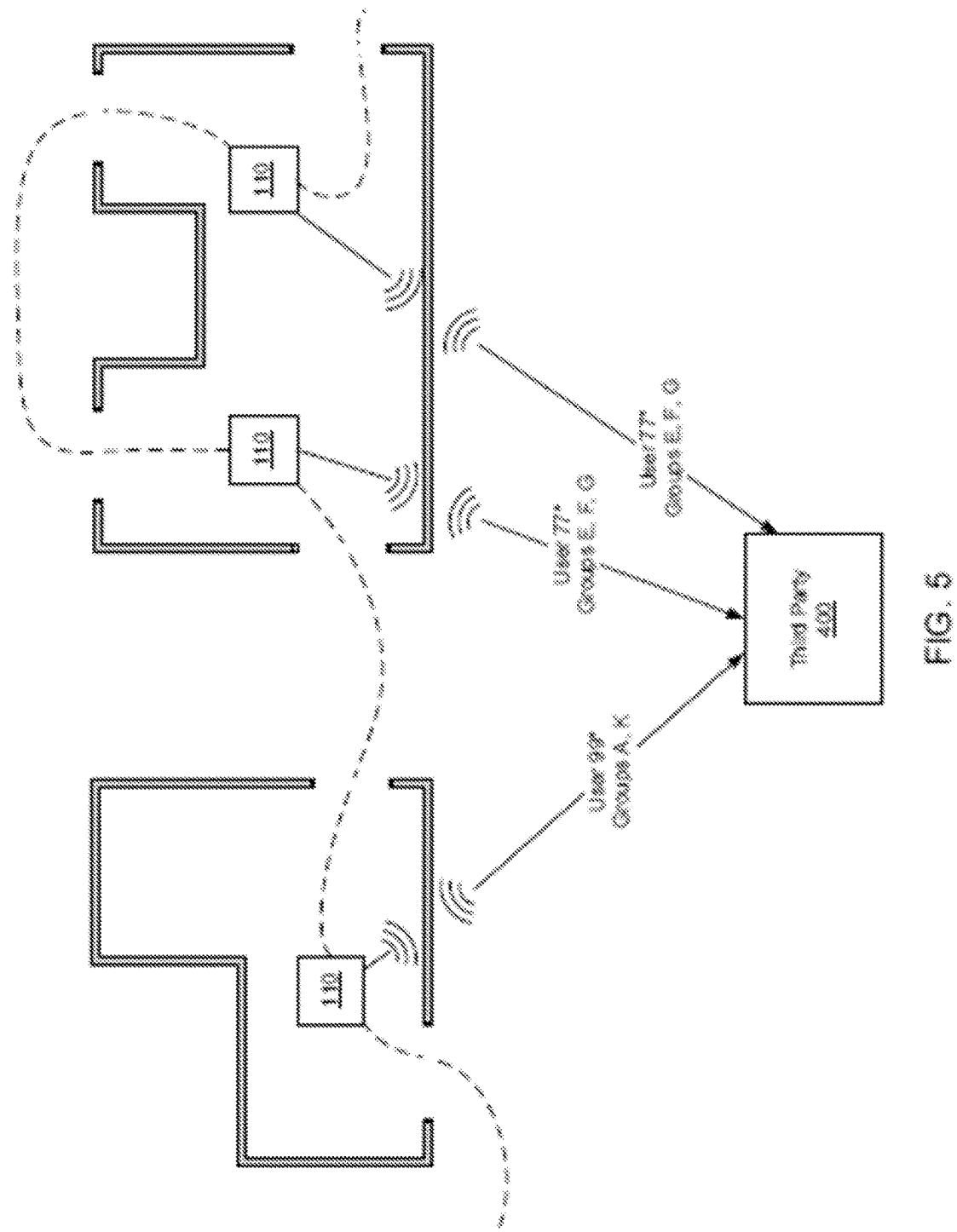
FIG. 5 is a process flow diagram of an alternative method for determining effectiveness of an advertisement presented to online system users based on offline conversion, in accordance with an embodiment.

FIG. 5 is a process flow diagram of an alternative implementation of a method for measuring offline conversions of an advertisement presented to users of an online system. In some implementations, a client device 110 directly sends encrypted information identifying one or more advertising groups including a user associated with the client device 110 user to the third party 300 when the client device 110 is within a threshold distance of a conversion location, or when another suitable event occurs. Information identifying one or more advertising groups including a user may be sent from the online system 140 to a client device 110 associated with the user and stored on the client device 110 associated with the user. In one embodiment, information identifying one or more advertising groups including the user is sent to the client device 110 associated with the user when an advertising campaign begins. Alternatively, the client device 110 associated with the user retrieves information identifying one or more advertising groups including the user from the online system 140 at specified time intervals. For example, if a client device 110 associated with a user is within a threshold distance of a conversion location, the client device 110 sends information to the third party 300 identifying one or more advertising groups including the user and information unique to the client device 110 at its location.

Information identifying one or more advertising groups including a user sent by a client device 110 to the third party 300 may be limited to advertising groups relevant to a particular conversion location and information unique to the client device 110. For example, if an advertisement for a particular athletic shoe and two advertisements for a gym were presented to a user via a client device 110, a unique user identifier and encrypted information identifying advertising groups relevant to the advertisement for the athletic shoe and that include the user are transmitted by the client device 110 to the third party 300 when the client device 110 is within a threshold distance of a physical location of a retail store selling the particular athletic shoe. Similarly, if the client device 110 enters the advertised gym, a unique identifier and encrypted information identifying one or more advertising groups relevant to the advertisements for the gym and that include the user are transmitted to the third party 300. Information unique to a client device 110 may be specific to conversion locations, allowing the same information unique to a client device 110 to be transmitted when the client device 110 is within a threshold distance of different conversion locations.

In the example of FIG. 5, when a client device 110 associated with user is within an area associated with a conversion location, such as a building, the client device 110 sends the third party 300 information unique to the client device 110, such as user identifying information of the user associated with the client device 110 (e.g., User 99 in the example of FIG. 5) and encrypted information about advertising groups including the user that are relevant to the conversion location (e.g., advertising groups A* and K* in the example of FIG. 5). In the example of FIG. 5, encrypted information identifying advertising groups A* and *K but not additional advertising groups including the user are sent by the client device 110, as the additional advertising groups are not relevant to the conversion location.

Continuing the example shown by FIG. 5, when the client device 110 associated with the user enters a physical location associated with a different conversion location, the client device 110 sends different information unique to the client device 110 (e.g., User 77 in the example of FIG. 5) and encrypted information identifying additional advertising groups including the user and relevant to the different conversion location (e.g., advertising groups E*, F*, and G* in the example of FIG. 5) to the third party 300. The information unique to the client device 110 and encrypted information identifying additional advertising groups including the user may be sent to the third party 300 each time the client device 110 associated with the user enters the physical location associated with the conversion location. In the example of FIG. 5, the client device 110 sends User 77 and information identifying advertising groups E*, F*, and G* to the third party 300 each time the client device 110 is within a threshold distance of the physical location associated with the conversion location. As shown in FIG. 5, the information unique to the client device 110 is unique for each conversion location, which prevents multiple entries of the client device 110 into an area within a threshold distance of a conversion location from being identified as different client devices 110 being within the threshold distance of the conversion location.

In some embodiments, the online system 140 has access to location information associated with the client device 110. For example, the client device 110 includes an application that provides location information to the online system 140 in accordance with a user's privacy settings, if certain conditions are met (e.g., bringing the application to the foreground). In these embodiments, the online system 140 determines if the location information from the client device 110 is within a threshold distance of a conversion location associated with an advertisement, rather than the client device 110 performing the determination as described above in conjunction with FIG. 3. The online system may then directly generate information describing the effectiveness of the advertisement without performing the communication with the third party 300 discussed in conjunction with FIG. 3.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving over a computer network, a digitally encrypted identifier associated with a user of an online system from a third party server, the digitally encrypted identifier received by the third party server via one or more computer devices;
decrypting the digitally encrypted identifier to identify the user;
determining if privacy settings associated with the user of the online system enables tracking by the third party server;
responsive to the privacy settings enabling the tracking, identifying, based on the digitally encrypted identifier associated with the user, one or more groups that include the user of the online system, wherein the one or more groups are maintained by the online system;
digitally encrypting information identifying the one or more groups that include the user of the online system;
sending over the computer network, the digitally encrypted information identifying the one or more groups to the third party server;
receiving conversion information from the third party server describing a plurality of client devices within a threshold distance of a geographic location associated with an advertisement presented to one or more users of the online system included in the one or more groups, wherein the one or more users include the user; and
determining a metric describing an effectiveness of the advertisement for the one or more groups based on the received conversion information from the third party server; and
sending, over the computer network, the metric to the third party server.

2. The method of claim 1, further comprising:
receiving, at the online system, information identifying the geographic location associated with the advertisement;
sending, to one or more client devices included in the plurality of client devices, information identifying the one or more users of the online system;
identifying an opportunity to present, via the one or more client devices included in the plurality of client devices, the advertisement to the one or more users of the online system; and
sending the advertisement and the information identifying the geographic location associated with the advertisement to the one or more client devices included in the plurality of client devices.

3. The method of claim 1, wherein the one or more groups includes at least one of: a first set of users of the online system having at least one common demographic characteristic in user profiles associated with the one or more users of the online system, a second set of users of the online system associated with a specific action captured by the online system, a third set of users of the online system associated with a specific type of action captured by the online system, a fourth set of users of the online system having a connection to an object maintained by the online system, a fifth set of users associated with a geographic location, and any combination thereof.

4. The method of claim 1, wherein the one or more computer devices comprises at least one of: a device associated with the user, a computer networking device, a device associated with a retail location, and any combination thereof.

5. The method of claim 1, wherein determining the metric describing the effectiveness of the advertisement for the one or more groups based on the received conversion information from the third party server comprises:
identifying a number of client devices associated with a group of one or more users of the online system that were not presented with the advertisement from the received information from the third party server;
identifying a number of client devices associated with an additional group of one or more users of the online system presented with the advertisement from the received information from the third party server; and
generating the metric describing the effectiveness of the advertisement for the additional group based at least in part on the number of client devices associated with the group and at least in part on the number of client devices associated with the additional group.

6. The method of claim 1, further comprising:
storing the metric describing the effectiveness of the advertisement for the one or more groups.

7. The method of claim 1, wherein the geographic location associated with the advertisement is based on information including at least one of: a coordinate specifying a physical location and a dimension associated with the coordinate, coordinates of one or more physical locations, an identifier of a wireless access point and a minimum signal strength from the wireless access point, an identifier of a cellular telephone site and a minimum signal strength from the cellular telephone site, a model predicting a location of the user based on one or more point clouds, and any combination thereof.

8. The method of claim 1, further comprising:
sending a query to the third party server; and
wherein receiving the information from the third party server describing the plurality of client devices within the threshold distance of the geographic location associated with the advertisement presented to the one or more users of the online system included in the one or more groups, is in response to the sent query.

9. A system comprising:
a processor; and
a non-transitory computer-readable storage medium coupled to the processor, the non-transitory computer-readable storage medium having instructions encoded thereon that, when executed by the processor, cause the processor to:
receive over a computer network, a digitally encrypted identifier associated with a user of an online system from a third party server, the digitally encrypted identifier received by the third party server via one or more computer devices;
decrypt the digitally encrypted identifier to identify the user;
determine if privacy settings associated with the user of the online system enables tracking by the third party server;
responsive to the privacy settings enabling the tracking, identify, based on the digitally encrypted identifier associated with the user, one or more groups that include the user of the online system, wherein the one or more groups are maintained by the online system;
digitally encrypt information identifying the one or more groups that include the user of the online system;
send over the computer network, the digitally encrypted information identifying the one or more groups to the third party server;
receive conversion information from the third party server describing a plurality of client devices within a threshold distance of a geographic location associated with an advertisement presented to one or more users of the online system included in the one or more groups, wherein the one or more users include the user; and
determine a metric describing an effectiveness of the advertisement for the one or more groups based on the received conversion information from the third party server; and
send, over the computer network, the metric to the third party server.

10. The system of claim 9, wherein the instructions causing the processor to determine the metric describing the effectiveness of the advertisement for the one or more groups based on the received conversion information from the third party server comprise instructions causing the processor to:
identify a number of client devices associated with a group of one or more users of the online system that were not presented with the advertisement from the received conversion information from the third party server;
identify a number of client devices associated with an additional group of one or more users of the online system presented with the advertisement; and
generate the metric describing the effectiveness of the advertisement for the one or more groups based at least in part on the number of client devices associated with the group and at least in part on the number of client devices associated with the additional group.

11. A method comprising:
receiving, over a computer network, digitally encrypted data identifying a user of an online system that is associated with a client device, and including a location associated the client device;
requesting digitally encrypted group information that includes information about the user from the online system, and that is identified based on the digitally encrypted data identifying the user;
receiving the requested digitally encrypted group information from the online system;
associating the digitally encrypted data identifying the user with the received digitally encrypted group information;
receiving information describing a plurality of client devices within a threshold distance of a geographic location associated with an advertisement presented to the user; and
determining, based on the received information describing the plurality of client devices, a metric describing an effectiveness of the advertisement for one or more groups associated with the digitally encrypted group information.

12. The method of claim 11, wherein the digitally encrypted group information that includes information about the user is associated with at least one of: a first set of one or more users of the online system having at least one common demographic characteristic in associated user profiles, a second set of one or more users of the online system associated with a specific action captured by the online system, a third set of one or more users of the online system associated with a specific type of action captured by the online system, a fourth set of one or more users of the online system having a connection to an object maintained by the online system, or a fifth set of one or more users associated with a geographic location.

13. The method of claim 11, wherein the digitally encrypted data identifying the user of the online system that is associated with the client device is received via one or more devices, the digitally encrypted data identifying the user including an identifier of a wireless access point.

14. The method of claim 11, wherein the digitally encrypted data identifying a user of an online system that is associated with a client device is an encrypted media access control address associated with the client device.

15. The method of claim 11, wherein the location is selected from a group consisting of: a coordinate specifying a physical location and a dimension associated with the coordinate, coordinates of one or more physical locations, an identifier of a wireless access point and a minimum signal strength from the wireless access point, an identifier of a cellular telephone site and a minimum signal strength from the cellular telephone site, a model predicting a location of the user based on one or more point clouds, and any combination thereof.

16. The method of claim 11, further comprising:
sending to the online system information describing the plurality of client devices associated with the location within a particular time range.

17. The method of claim 16, wherein the information is sent responsive to a request received from the online system.

* * * * *